(12) United States Patent
Gurvich et al.

(10) Patent No.: US 10,927,883 B2
(45) Date of Patent: Feb. 23, 2021

(54) COMPOSITE JOINT ASSEMBLY

(71) Applicant: UNITED TECHNOLOGIES CORPORATION, Farmington, CT (US)

(72) Inventors: Mark R. Gurvich, Middletown, CT (US); Georgios S. Zafiris, Glastonbury, CT (US); Rony Giovanni Ganis, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 752 days.

(21) Appl. No.: 15/646,506

(22) Filed: Jul. 11, 2017

(65) Prior Publication Data

US 2019/0017538 A1     Jan. 17, 2019

(51) Int. Cl.
    *F16C 3/02*               (2006.01)
    *B29C 65/00*            (2006.01)
    (Continued)

(52) U.S. Cl.
CPC .............. *F16C 3/026* (2013.01); *B29C 65/56* (2013.01); *B29C 66/1162* (2013.01); *B29C 66/126* (2013.01); *B29C 66/526* (2013.01); *B29C 66/534* (2013.01); *B29C 66/5344* (2013.01); *B29C 66/721* (2013.01); *F16D 1/108* (2013.01);
(Continued)

(58) Field of Classification Search
CPC .......... F16C 3/026; F16C 7/026; B29C 65/56; B29C 65/567; B29C 65/568; B29C 66/70; B29C 66/71; B29C 66/712; B29C 66/74; B29C 66/742; B29C 57/00; B29C 57/02; B29C 57/10; F16B 7/02; F16B 7/025; Y10T 403/49; Y10T 403/7064
See application file for complete search history.

(56) References Cited

U.S. PATENT DOCUMENTS 4,236,386 A * 12/1980 Yates ...................... B29C 70/86
                                                                    138/109
4,238,540 A * 12/1980 Yates ...................... F16C 3/026
                                                                    156/172
(Continued)

FOREIGN PATENT DOCUMENTS

DE      102007051517 A1 * 4/2009 ............. B29C 70/52
DE      102017216085         3/2018
(Continued)

OTHER PUBLICATIONS

Mark R. Gurvich, et al. U.S. Appl. No. 16/003,865, filed Jun. 8, 2018 entitled "Composite Joint Assembly".

(Continued)

*Primary Examiner* — Jonathan P Masinick
(74) *Attorney, Agent, or Firm* — Snell & Wilmer L.L.P.

(57) ABSTRACT

A composite tube may include a body having a longitudinal centerline axis and an end portion having a tapered section and an end rim. At least one of a radially outward edge and a radially inward edge of the end rim may be non-circular. The end rim may be circumferentially continuous. The end rim may be an undulating annulus. A joint assembly may include a support wedge that at least partially engages at least one of a radially inward surface of the end portion and a radially outward surface of the end portion of the composite tube.

15 Claims, 5 Drawing Sheets

(51) Int. Cl.
  *B29C 65/56* (2006.01)
  *F16D 1/108* (2006.01)
  *F16B 7/02* (2006.01)
  *B29L 31/06* (2006.01)
  *B29L 31/30* (2006.01)

(52) U.S. Cl.
  CPC ... *B29L 2031/06* (2013.01); *B29L 2031/3076* (2013.01); *F16B 7/02* (2013.01); *F16C 2208/02* (2013.01); *F16C 2208/58* (2013.01); *F16C 2208/86* (2013.01); *F16C 2226/80* (2013.01); *F16C 2326/43* (2013.01)

(56) References Cited

U.S. PATENT DOCUMENTS

| | | | |
|---|---|---|---|
| 4,279,275 A | | 7/1981 | Stanwood et al. |
| 4,849,152 A | * | 7/1989 | Rumberger ........... B29C 53/566 264/308 |
| 5,043,217 A | | 8/1991 | Peters et al. |
| 5,215,413 A | | 6/1993 | Nance |
| 5,397,272 A | * | 3/1995 | Smiley .................... F16C 3/026 138/109 |
| 8,262,825 B2 | | 9/2012 | Fahey et al. |
| 8,430,759 B2 | | 4/2013 | Wanthal |
| 8,801,994 B2 | | 8/2014 | Dewhirst |
| 9,217,463 B2 | * | 12/2015 | Oessenich ................. F01D 5/06 |
| 9,441,374 B2 | * | 9/2016 | Ganis ....................... E04C 3/36 |
| 9,568,040 B2 | * | 2/2017 | Ganis ...................... F16B 7/025 |
| 9,726,325 B2 | * | 8/2017 | Ganis ........................ F16S 3/04 |
| 10,012,254 B2 | * | 7/2018 | Ito .......................... B29C 66/534 |
| 10,066,649 B2 | * | 9/2018 | Ganis ........................ F16J 1/008 |
| 10,532,518 B2 | | 1/2020 | Gurvich ................ B29C 66/612 |
| 10,539,174 B2 | | 1/2020 | Gurvich .................. B29C 57/10 |
| 2010/0122606 A1 | * | 5/2010 | Stephan .................. B29C 70/86 74/579 R |
| 2016/0272304 A1 | | 9/2016 | Goldring et al. |
| 2017/0051767 A1 | * | 2/2017 | Giannakopoulos ........................ F15B 15/1447 |
| 2017/0102012 A1 | | 4/2017 | Ganis et al. |
| 2017/0198734 A1 | * | 7/2017 | Bernard .................. F16C 7/026 |
| 2017/0227058 A1 | | 8/2017 | Pollitt |
| 2017/0340860 A1 | * | 11/2017 | Eberhardt ......... A61M 25/0097 |
| 2018/0094663 A1 | * | 4/2018 | Gurvich .................. B64C 25/00 |
| 2018/0127241 A1 | * | 5/2018 | Fargo ...................... B66B 7/062 |
| 2018/0283425 A1 | * | 10/2018 | Bernard .................. F16C 7/026 |
| 2019/0128449 A1 | * | 5/2019 | Beale ...................... F16C 7/026 |
| 2019/0145448 A1 | * | 5/2019 | Gurvich ................ F16B 11/002 |

FOREIGN PATENT DOCUMENTS

| | | | | |
|---|---|---|---|---|
| EP | 3081822 | | 10/2016 | |
| GB | 1330313 | | 9/1973 | |
| GB | 2258899 A | * | 2/1993 | ............ E21B 17/04 |
| GB | 2454958 | | 5/2009 | |
| JP | H03288012 | | 12/1991 | |
| SU | 1513102 | | 10/1989 | |

OTHER PUBLICATIONS

European Patent Office, European Search Report dated Nov. 16, 2018 in Application No. 18183005.0.

European Patent Office, European Search Report dated Oct. 15, 2019 in Application No. 19179114.4.

USPTO, Pre-Interview First Office Action dated Mar. 24, 2020 in U.S. Appl. No. 16/003,865.

USPTO, First Action Interview Office Action dated Jul. 8, 2020 in U.S. Appl. No. 16/003,865.

USPTO, Notice of Allowance dated Sep. 10, 2020 in U.S. Appl. No. 16/003,865.

European Patent Office, European Search Report dated Nov. 11, 2020 in Application No. 18183005.0.

* cited by examiner

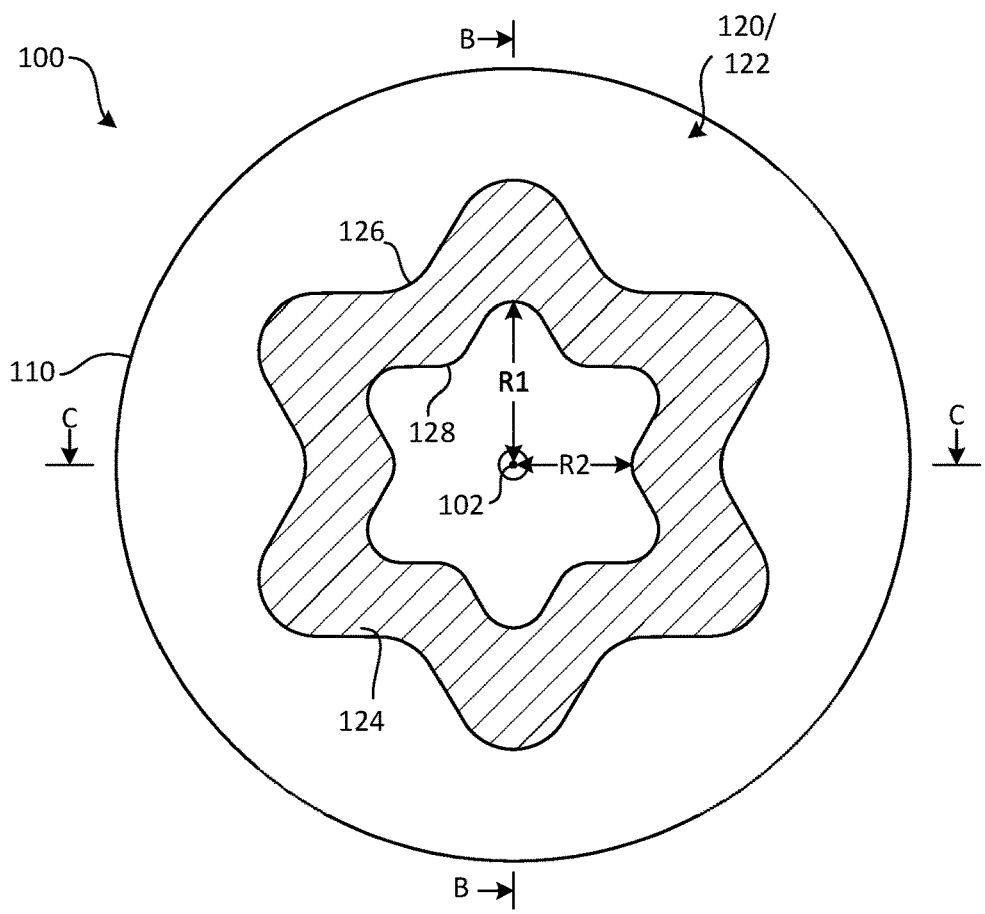
FIG. 2A
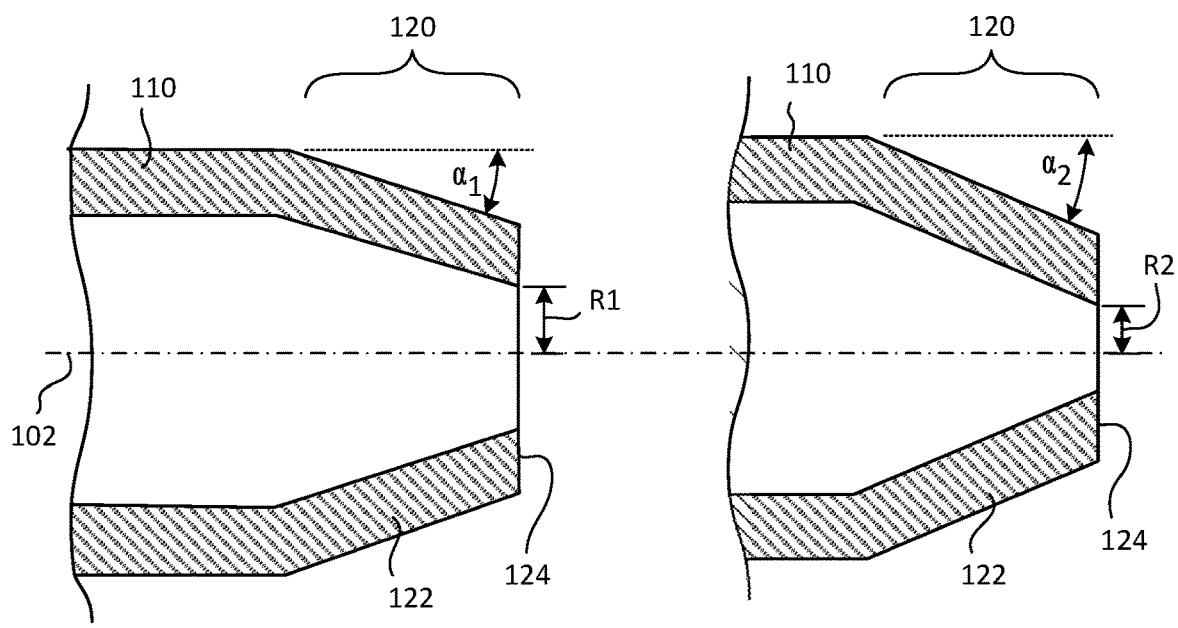
FIG. 2B
FIG. 2C

COMPOSITE JOINT ASSEMBLY

FIELD

The present disclosure relates generally to composite joints and more specifically to improving load transfer via composite joints.

BACKGROUND

Conventionally, various types of aircraft utilize actuators including, for example, to deploy nose, body, and/or wing landing gear systems. Conventional actuator components are made of metallic materials and often comprise complex geometries and high strengths. However, these metallic components are typically heavy.

Substitution of metals by fiber-reinforced polymer-matrix composites (PMC) is one way to reduce weight of landing gears or aircraft actuators. Among significant challenges is implementation of strong joints for load transfer from composite elements to metallic parts. The composite elements are typically fabricated in the form of tubes and are capable of handling significant axial loads under both tension and compression. However, conventional methods of attaching composite materials to other materials can reduce the structural performance of the joint, especially when said joints are subjected to axial and/or torsional loads.

SUMMARY

In various embodiments, the present disclosure provides a composite tube that includes a body and an end portion. The body has a longitudinal centerline axis and the end portion has a tapered section terminating at an end rim, according to various embodiments. At least one of a radially outward edge of the end rim and a radially inward edge of the end rim is non-circular, according to various embodiments.

In various embodiments, the end rim is circumferentially continuous. In various embodiments, the end rim is an undulating annulus. In various embodiments, at least one of the radially outward edge and the radially inward edge of the end rim comprises an undulating wave-like shape. In various embodiments, the tapered section includes a plurality of folds that form circumferentially distributed grooves extending along the tapered section. In various embodiments, the tapered section converges radially inward in a direction from the body to the end rim. The body of the composite tube may have a circular cross-section.

Also disclosed herein, according to various embodiments, is a joint assembly. The joint assembly may include a composite tube and a support wedge. The composite tube has a body and an end portion, according to various embodiments. The body may have a longitudinal centerline axis and the end portion may have an end rim that is circumferentially continuous. In various embodiments, at least one of a radially outward edge and a radially inward edge of the end rim is non-circular. The support wedge may at least partially engage at least one of a radially inward surface of the end portion and a radially outward surface of the end portion.

In various embodiments, the end portion of the composite tube includes a tapered section that converges radially inward in a direction from the body to the end rim. In various embodiments, the radially inward surface and the radially outward surface are walls of the tapered section of the end portion. In various embodiments, the tapered section includes a plurality of folds that form circumferentially distributed grooves extending along the tapered section. The support wedge may have contours that complement the circumferentially distributed grooves of the tapered section. In various embodiments, the end rim is an undulating annulus.

In various embodiments, at least one of the radially inward surface and the radially outward surface includes a plurality of folds that form circumferentially distributed grooves. The support wedge may be a first support wedge and the joint assembly may further include a second support wedge that engages the other of the radially inward surface and the radially outward surface. In various embodiments, the first support wedge is an external support wedge that has an annular structure that is concentric with the longitudinal centerline axis and that circumscribes the end portion of the composite tube.

Also disclosed herein, according to various embodiments, is a method of forming/manufacturing a joint assembly. The method may include forming an end portion of a composite tube. The end portion may include an end rim and at least one of a radially outward edge and a radially inward edge of the end rim may be non-circular. The method may further include engaging a support wedge to the end portion of the composite tube such that the support wedge includes contours that complement the end portion. In various embodiments, the method further includes, after engaging the support wedge to the end portion of the composite tube, curing the composite tube (e.g., when using a thermoset matrix) or solidifying the composite tube (e.g., when using a thermoplastic matrix).

In various embodiments, forming the end portion includes tapering the end portion of the composite tube to form a tapered section that converges radially inward in a direction from the body to the end rim. In various embodiments, forming the end portion includes shaping the end portion to have a plurality of folds that form circumferentially distributed grooves along at least one of radially inward surface and a radially outward surface of the end portion. Shaping the end portion may include using the support wedge as a mold. In various embodiments, the support wedge is an internal support wedge and the method further includes engaging an annular external support wedge to the end portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 2A illustrates an end view of an end portion of a composite tube, in accordance with various embodiments;

FIG. 2B illustrates a cross-sectional side view, from viewpoint "B" in FIG. 2A, of the end portion of the composite tube of FIG. 2A, in accordance with various embodiments;

FIG. 2C illustrates a cross-sectional side view, from viewpoint "C" in FIG. 2A, of the end portion of the composite tube of FIG. 2A, in accordance with various embodiments;

Figure 1:
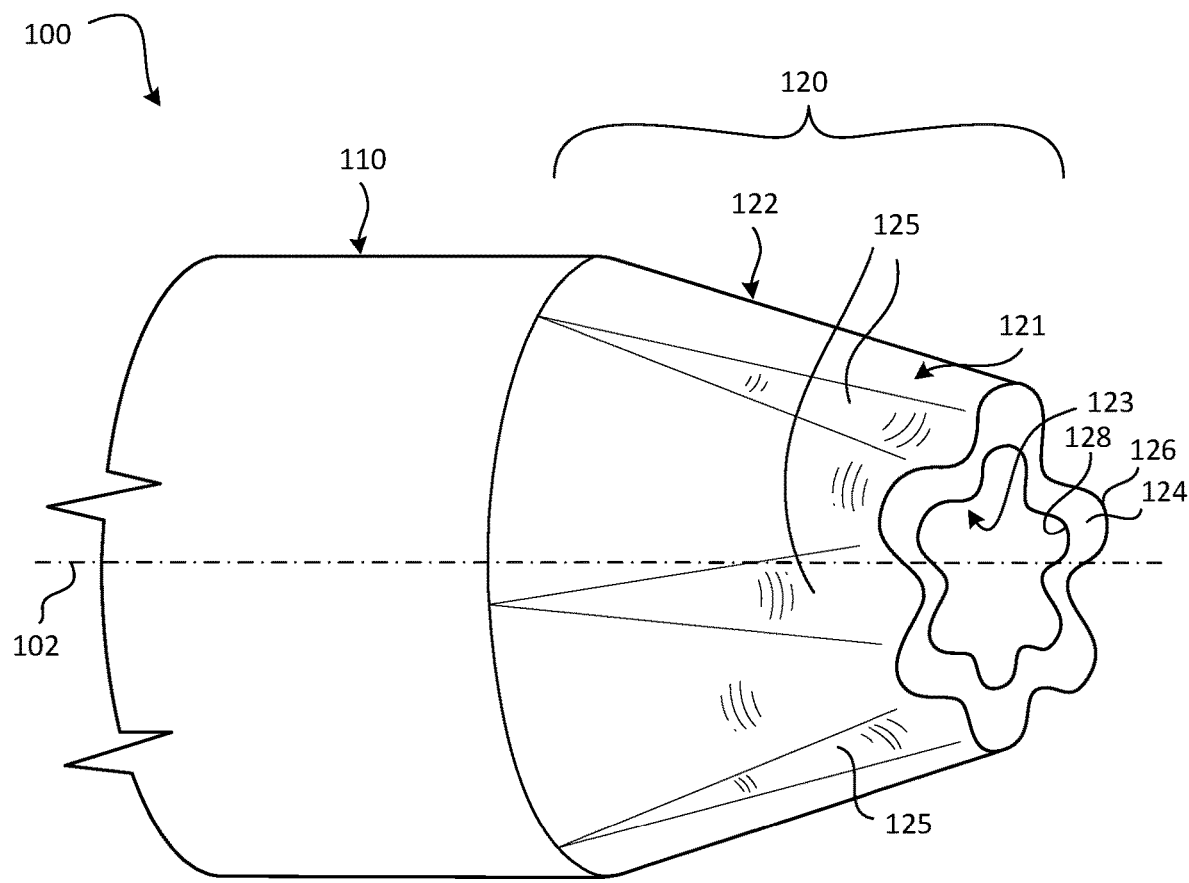
FIG. 1 illustrates a perspective view of an composite tube having a body and an end portion, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. Throughout the present disclosure, like reference numbers denote like elements.

The present disclosure describes composite tubes and composite joint assemblies. In various embodiments, the present disclosure relates to connecting composite tubes to other components via a composite joint assembly (e.g., "joints"). Such joints may be used in aircraft systems, such as, for example, landing gear systems. However, the systems and methods of the present disclosure may be suitable for use in non-aircraft systems as well.

As used herein, the term "axial" refers to a position or direction along a longitudinal centerline axis of a composite tube. Also, the term "radial" refers to a position or direction away from the longitudinal centerline axis of the composite tube. For example, a first component that is "radially inward" of a second component means that the first component is positioned closer to the longitudinal centerline axis of the composite tube than the second component.

As mentioned above, substitution of metals by fiber-reinforced polymer-matrix composites (PMC) is one way to reduce weight of landing gears or aircraft actuators. Among significant challenges is implementation of strong joints for load transfer from composite tube elements to metallic parts. In various embodiments, the composite tubes are fabricated to handle axial and/or torsional loads.

Stress concentrations may be generated in areas of the joint in response to axial and/or torsional loading of the composite tube. These stress concentrations indicate the most loaded locations in the composite element and, therefore, may be main factors affecting limits of their structural performance, i.e., their strength. Accordingly, the present disclosure, according to various embodiments, relates to improving joint strength of composite joint assemblies.

With reference to FIG. 1, a composite tube 100 is illustrated having a body 110 and an end portion 120. The end portion 120, according to various embodiments, includes a tapered section 122 and an end rim 124. The end rim 124 is bound by a radially outward edge 126 and a radially inward edge 128. In various embodiments, at least one of the radially outward edge 126 and the radially inward edge 128 is non-circular. The end rim 124 may be circumferentially continuous and thus may be a non-circular annulus. As used herein, the term "non-circular annulus" means a ring-like shape that has an inner border that is non-circular and/or an outer border that is non-circular. For example, the radially outward edge 126 and/or the radially inward edge 128 of the end rim 124 may have an undulating, wave-like ring shape.

In various embodiments, the body 110 of the composite tube 100 defines a hollow chamber extending along the longitudinal centerline axis 102. The body 110 of the composite tube 100 may by cylindrical and thus may have a circular cross-sectional shape. Accordingly, the shape of the end portion 120 (e.g., the non-circular end rim 124) may be different than the cross-sectional shape of the body 110, which may improve the torsional load transfer capabilities of the composite tube 100 when implemented in a joint assembly, as described in greater detail below. Also contributing to the load transfer capabilities of the composite tube 100 is the tapering shape of the end portion 120.

In various embodiments, the end portion 120 converges radially inward in a direction from the body 110 towards the end rim 124. Thus, the tapered section 122 may have a quasi-conical shape. Stated differently, the tapered section 122 may have a converging, cone-like shape but the "walls" of the cone-like shape may be circumferentially undulating, thus forming fold-like contours into the walls of the tapered section 122. In various embodiments, the tapered section 122 of the end portion 120 has a plurality of folds that form circumferentially distributed grooves 125 extending along the tapered section 122. In various embodiments, the folds/grooves 125 may extend along the entire length of the tapered section 122, the grooves 125 may be shorter than the tapered section 122, or the grooves 125 may be longer than the tapered section 122. In various embodiments, the tapered section 122 has a non-circular cross-section, which may be similar to the shape of the end rim 124. Said differently, at least one of a radially inward surface 123 and a radially outward surface 121 of the end portion 120 (e.g., the tapered section 122 of the end portion 120) may have contours, grooves, channels, etc., that impart a non-circular cross-sectional shape to the end portion 120 of the composite tube 100. In various embodiments, the folds/grooves 125 are smooth curves that may be free of sharp or abrupt directional changes.

As described in greater detail below with reference to FIG. 5, the folds/grooves 125 may be formed by crimping and/or clamping an uncured composite tube. Also as described in greater detail below with reference to FIG. 5, the composite tube 100 may be a polymer-matrix composite (e.g., a fiber-reinforced polymer or a polymer without fiber reinforcement). In various embodiments, the composite tube 100 is made from a carbon fiber composite material or a glass fiber composite material or organic fiber reinforced composite materials or a combination thereof. The weight, strength, and stiffness of composite tubes may be dictated by fiber type, fiber stiffness, fiber strength, fiber direction/placement, resin system used, and other parameters of the composite lay-up.

An end view of the end portion 120 of the composite tube 100, according to various embodiments, is provided in FIG. 2A. The end rim 124 of the end portion 120 may have an undulating shape and thus the radius, relative to the longitudinal centerline axis 102, of the opening defined by the end rim 124 may vary. For example, inner radial dimension R1 may be greater than inner radial dimension R2. Said differently, the radial distance between the longitudinal centerline axis 102 and the radially inward edge 128 of the end rim 124 may vary. In various embodiments, the radial distance between the longitudinal centerline axis 102 and the radially outward edge 126 of the end rim 124 may vary. In various embodiments, the wave-like end rim 124 includes waves that have uniform shapes and curvatures. In various embodiments, however, the wave-like end rim 124 includes wave sections that are not uniform with each other and thus have different shapes and curvatures. In various embodiments, the number of waves may be different than what is shown in the figures. In various embodiments, the number of waves is at least one. In various embodiments, the number of waves is 2 or more. For example, in various embodiments, the number of waves is between 3 and 6.

In various embodiments, and with reference to FIGS. 2B and 2C, because of the non-circular shape of the end portion 120 of the composite tube 100, the angled orientation of the tapered section 122 may vary around the circumference of the end portion 120. FIG. 2B is a side view of the composite tube 100 of FIG. 2A from viewpoint "B" in FIG. 2A while FIG. 2C is a side view of the composite tube 100 of FIG. 2A from viewpoint "C" in FIG. 2A. As used herein, "α" is the angle between the longitudinal centerline axis 102 of the body 110 of the composite tube 100 and the tapered section 122 that forms the end portion 120. Thus, "α" refers to the bend angle of either external or internal surfaces of the tapered section 122 of the end portion 120 relative to the body 110. In various embodiments, $\alpha_1$ in FIG. 2B, which corresponds with R1, is less than $\alpha_2$ in FIG. 2C, which corresponds with R2. In various embodiments, bend angle α may be between 0 degrees and 60 degrees. In various embodiments, the bend angle α may be selected according to the specifics of a given application/configuration (e.g., depending on an expected/anticipated load transfer).

Figure 3:
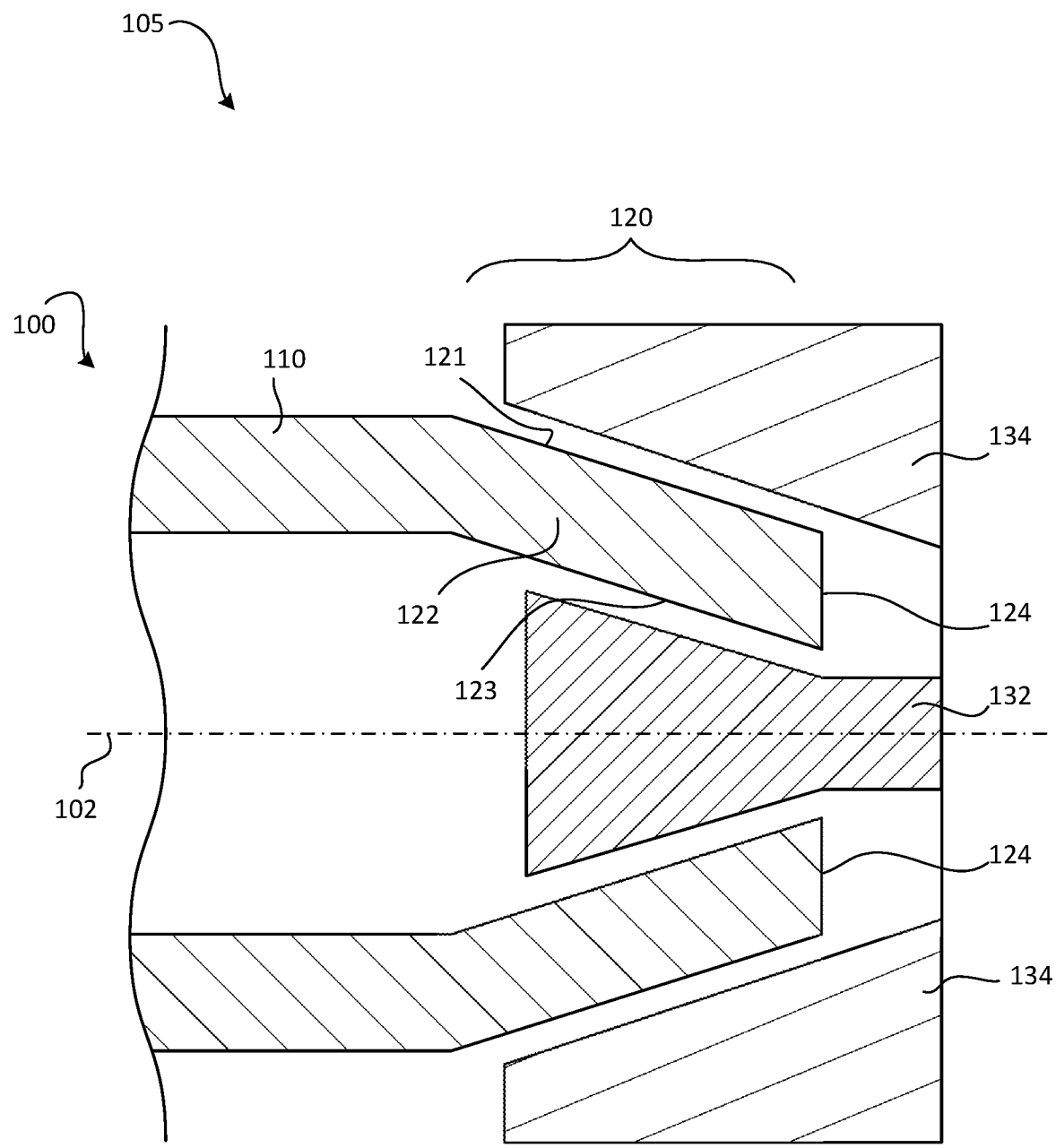
FIG. 3 illustrates a cross-sectional side view of a joint assembly, in accordance with various embodiments.

In various embodiments, and with reference to FIG. 3, a joint assembly 105 is provided. The joint assembly 105 includes the composite tube 100 coupled to one or more support wedges 132, 134. Said differently, at least one support wedge 132, 134 may at least partially engage at least one of the radially inward surface 123 and the radially outward surface 121 of the end portion 120 of the composite tube 100 (though in FIG. 3 the wedge(s) 132, 134 are shown removed from the respective surfaces 121, 123 of the end portion 120, in practice the wedge(s) 132, 134 are contacting the respective surfaces 121, 123 of the end portion 120). In various embodiments, engagement between the support wedge(s) and the end portion 120 is direct contact. The direct contact may be enhanced by pre-stress where the end portion and the support wedge(s) are mutually compressed during assembly of the joint and/or during service. The support wedge(s) 132, 134 may have contours that complement the non-circular shape of the end portion 120 of the composite tube 100, as described in greater detail below with reference to FIGS. 4A, 4B, and 4C.

In various embodiments, the support wedge(s) 132, 134 are made from a metallic material. The support wedge(s) 132, 134 may be made from other materials, such as fiber-reinforced PMC, and/or ceramic materials, among others. The support wedge(s) 132, 134 may be held against (e.g., engaged with) the end portion 120 by applying mechanical force, for example by threaded retraction of mechanical wedge 132 with respect to stationary wedge 134, or vice versa, or other similar attachment means. In various embodiments, the process of curing the composite tube 100 bonds the support wedge 132, 134 to the composite tube 100. In various embodiments, adhesives, resins, or bonding agents may be utilized to bond the support wedge(s) 132, 134 to the composite tube 100.

In various embodiments, and with continued reference to FIG. 3, the joint assembly 105 may include a first support wedge 132 and a second support wedge 134. The first support wedge 132 may be an internal support wedge 132 and thus may be inserted within the opening defined by the end rim 124 formed by converging tapered section 122 of the end portion 120 of the composite tube 100 to engage a radially inward surface 123 of the end portion 120. The second support wedge 134 may be an annular external support wedge 134 that is disposed about and substantially circumscribes the end portion 120 to engage a radially outward surface 121 of the end portion 120.

Figure 4A:
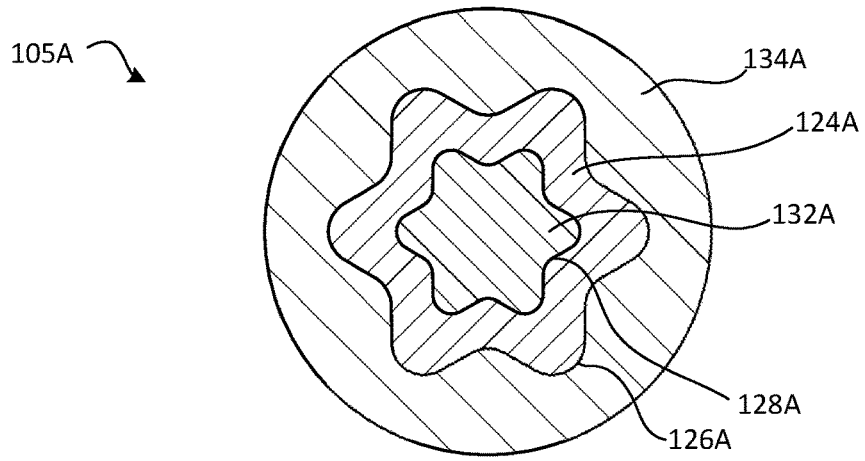
FIG. 4A illustrates a cross-sectional end view of a joint assembly, in accordance with various embodiments.
Figure 4B:
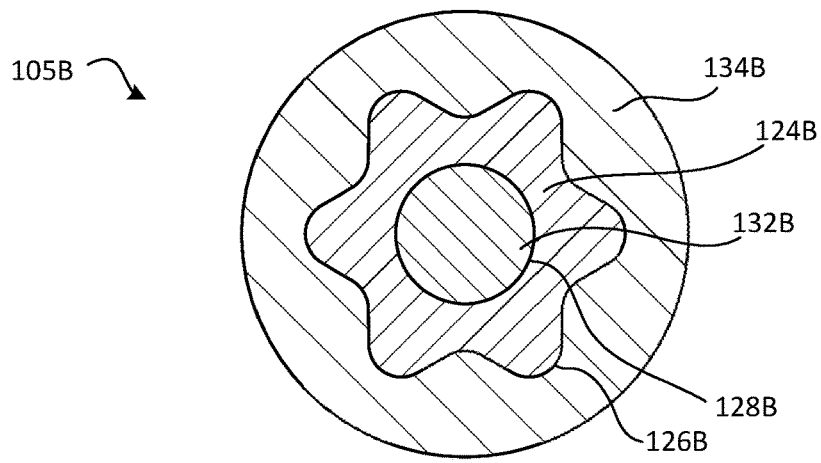
FIG. 4B illustrates a cross-sectional end view of a joint assembly, in accordance with various embodiments.
Figure 4C:
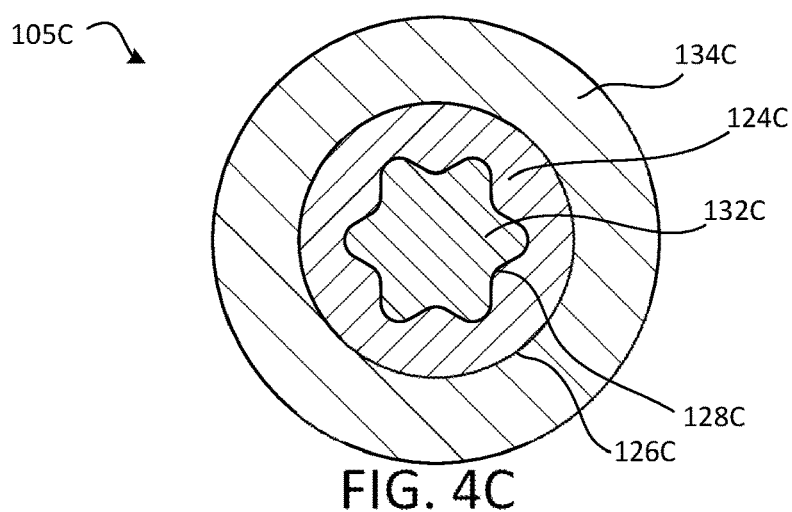
FIG. 4C illustrates a cross-sectional end view of a joint assembly, in accordance with various embodiments.

In various embodiments, and with reference to FIGS. 4A, 4B, and 4C, various configurations of a joint assembly are provided. Joint assembly 105A, with reference to FIG. 4A, includes an end rim 124A that has both a non-circular radially outward edge 126A and a non-circular radially inward edge 128A, according to various embodiments. In various embodiments, the internal support wedge 132A may be contoured to complement the radially inward surface 123 (FIG. 3) of the end portion 120 of the composite tube 100 and the annular external support wedge 134A may be contoured to complement the radially outward surface 121 (FIG. 3) of the end portion 120 of the composite tube 100.

Joint assembly 105B, with reference to FIG. 4B, includes an end rim 124B that has a non-circular radially outward edge 126B and a circular radially inward edge 128B, according to various embodiments. In various embodiments, the internal support wedge 132B may have a circular cross-section that complements a frustoconical, radially inward surface of the end portion 120 of the composite tube 100 and the annular external support wedge 134B may have a non-circular cross-section and thus may be contoured to complement the radially outward surface of the end portion 120 of the composite tube 100. In various embodiments, having only one of the surfaces of the end portion 120 be non-circular decreases manufacturing costs (e.g., less complex machining/manufacturing) and provides a similar torsional load transfer benefit. Joint assembly 105C, with reference to FIG. 4C, includes an end rim 124C that has a circular radially outward edge 126C and a non-circular radially inward edge 128C, according to various embodiments. In various embodiments, the internal support wedge 132C may have a non-circular cross-section that complements a radially inward surface of the end portion 120 of the composite tube 100 and the annular external support wedge 134C may have a circular cross-section and thus may have a frustoconical shape to complement the circular radially outward surface of the end portion 120 of the composite tube 100. In various embodiments, having only one of the surfaces of the end portion 120 be non-circular decreases manufacturing costs (e.g., less complex machining/manufacturing) and provides a similar torsional load transfer benefit.

Figure 5:
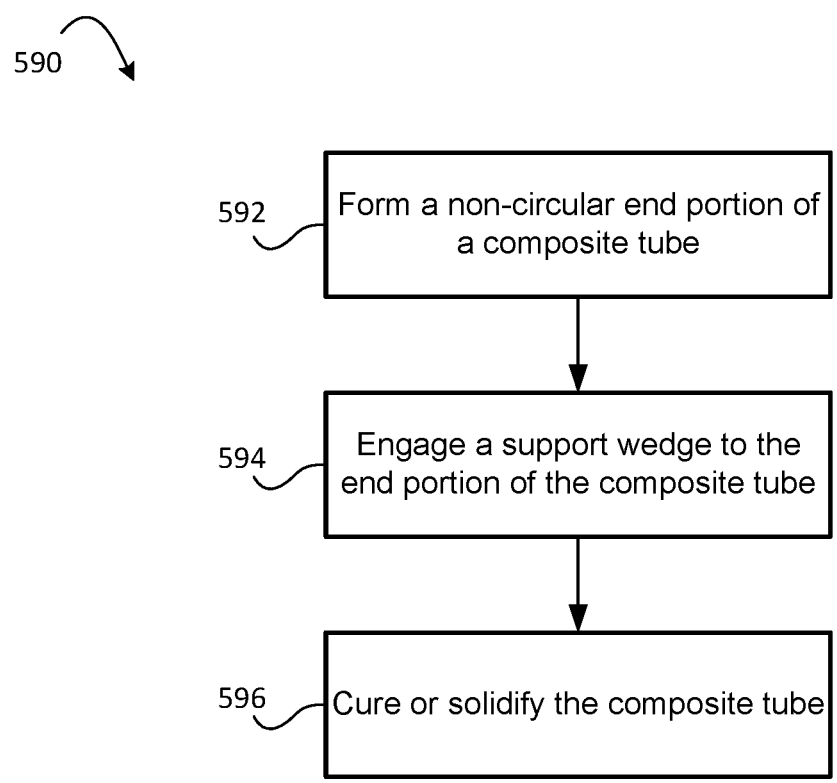
FIG. 5 is a schematic flow chart diagram of a method of manufacturing a joint assembly, in accordance with various embodiments.

In various embodiments, and with reference to FIG. 5, a method 590 for manufacturing a joint assembly is provided. The method 590 includes forming a non-circular end portion of a composite tube at step 592 and engaging a support wedge to the end portion of the composite tube at step 594, according to various embodiments. The method 590 further includes curing or solidifying the composite tube at step 596. In various embodiments, step 592 includes rendering at least one of a radially outward edge and a radially inward edge of an end rim of the end portion non-circular.

In various embodiments, the composite tube may be formed of a thermoset or a thermoplastic material. In various embodiments, initially forming the composite tube may be performed using various manufacturing methods. For example, the method 590 may include laying up a fiber matrix material (e.g., fiber matt, fibers, prepreg, etc.) around/over a removable mandrel. The fiber matrix material may be applied over the mandrel using winding or wrapping techniques, such as a filament-winding technique or an automatic filament placement technique, among others. The method 590 may include impregnating the fiber matrix material with an uncured polymer thermoset resin, a molten thermoplastic polymer, or a thermoplastic polymer in solution. This resin impregnation step may be repeated with additional layers of fiber or fiber-matt matrix material. With thermoplastic materials, the method 590 may include heating the polymer matrix composite to consolidate, shape, and anneal the thermoplastic composite tube. Examples of thermoset polymer resins used in the various embodiments include, but not limited to, epoxy, polyimide, bis-maleimide, polyurethane, and blends or combinations thereof. Examples of thermoplastic polymers used in the various embodiments include, but are not limited to, polyetheretherketone, polyetherimide, polysulfone, polyphenylsulfone, polyphenylene sulfide, and blends or combinations thereof. Examples of fibers used in the various embodiments include, but not limited to, carbon fibers, aramid fibers, glass fibers, and combinations thereof.

In various embodiments, forming the non-circular end portion at step 592 and engaging the support wedge at step 594 may be performed substantially simultaneously. For example, an internal support wedge may be inserted into one (or both) open ends of the composite tube. The internal support wedge may have an external surface that has a desired non-circular cross-section (e.g., that includes grooves or channels). An external clamping force may be applied (e.g., a radial force, an axial force, or both) using clamp components, such as clamp shell molds, to form the end portion of the composite tube to the desired, non-circular shape. In various embodiments, instead of using separate external clamping components, the method may include using the annular external wedge support to provide the clamping pressure/force. In response to the end portion of the composite tube being molded or formed to the desired, non-circular shape, the composite tube may be cured with the internal wedge support secured within the converging tapered section of the composite tube. In various embodiments, the term "curing" may refer to curing thermoset materials or solidifying thermoplastic materials.

In various embodiments, forming the non-circular end portion at step 592 also includes tapering the end portion of the composite tube to form a tapered section that converges radially inward in a direction from the body to the end rim. The tapering step may also be performed substantially simultaneously as steps 592 and 594.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube comprising:
a body comprising a longitudinal centerline axis; and
an end portion comprising a tapered section terminating at an end rim, wherein one of a radially outward edge and a radially inward edge of the end rim is non-circular and the other of the radially outward edge and the radially inward edge is circular;
wherein the end rim is circumferentially continuous;
wherein the end rim is an undulating annulus;
wherein the one of the radially outward edge and the radially inward edge of the end rim comprises an undulating wave-like shape;
wherein the tapered section comprises a plurality of folds that form circumferentially distributed grooves extending along the tapered section; and
wherein the circumferentially distributed grooves are shorter than the tapered section, as measured in a direction along the longitudinal centerline axis, such that the circumferentially distributed grooves terminate on the tapered section.

2. The composite tube of claim 1, wherein the tapered section converges radially inward in a direction from the body to the end rim.

3. The composite tube of claim 1, wherein the body comprises a circular cross-section.

4. A joint assembly comprising:
a composite tube comprising a body having a longitudinal centerline axis and an end portion comprising an end rim that is circumferentially continuous, wherein a radially inward edge of the end rim is non-circular and a radially outward edge of the end rim is circular; and
a support wedge that at least partially engages a radially inward surface of the end portion, wherein the radially inward surface comprises an undulating shape of the end portion.

5. The joint assembly of claim 4, wherein the end portion of the composite tube comprises a tapered section that converges radially inward in a direction from the body to the end rim, wherein the radially inward surface and a radially outward surface are walls of the tapered section of the end portion.

6. The joint assembly of claim 5, wherein the tapered section comprises a plurality of folds that form circumferentially distributed grooves extending along the tapered section, wherein the circumferentially distributed grooves impart the undulating shape to the end portion.

7. The joint assembly of claim 6, wherein the support wedge comprises contours that complement the circumferentially distributed grooves of the tapered section.

8. The joint assembly of claim 7, wherein the end rim is an undulating annulus.

9. The joint assembly of claim 8, wherein the support wedge is a first support wedge, wherein the joint assembly further comprises a second support wedge that engages the radially outward surface.

10. The joint assembly of claim 9, wherein the second support wedge is an external support wedge that has an annular structure that is concentric with the longitudinal centerline axis and that circumscribes the end portion of the composite tube.

11. A method of forming a joint assembly, the method comprising:
forming an end portion of a composite tube, wherein the end portion comprises an end rim, wherein a radially inward edge of the end rim is non-circular and a radially outward edge is circular;
engaging a support wedge to the end portion of the composite tube, wherein the support wedge comprises contours that complement the end portion; and
after engaging the support wedge to the end portion of the composite tube, curing or solidifying the composite tube.

12. The method of claim 11, wherein forming the end portion comprises tapering the end portion of the composite tube to form a tapered section that converges radially inward in a direction from a body of the composite tube to the end rim.

13. The method of claim 11, wherein forming the end portion comprises shaping the end portion to have a plurality of folds that form circumferentially distributed grooves along a radially inward surface of the end portion.

14. The method of claim 13, wherein shaping the end portion comprises using the support wedge as a mold.

15. The method of claim 14, wherein the support wedge is an internal support wedge, wherein the method further comprises engaging an annular external support wedge to the end portion.

* * * * *